Aug. 12, 1969
G. C. TURNER
3,460,228
ROTARY SCRAP CHOPPER
Filed June 27, 1966
5 Sheets-Sheet 1
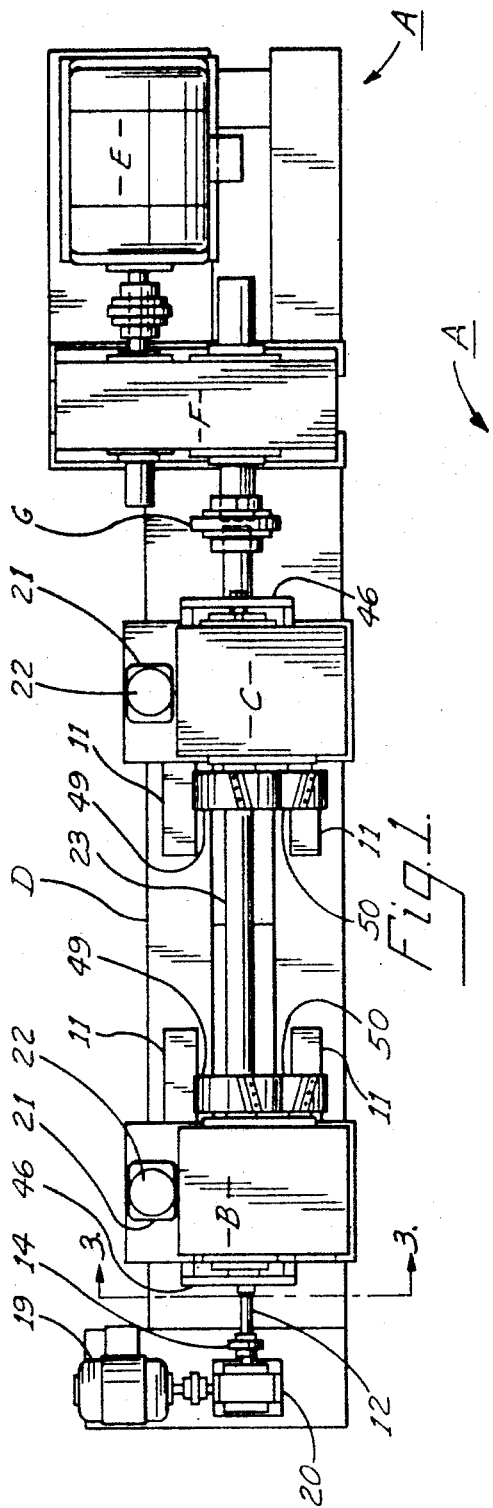
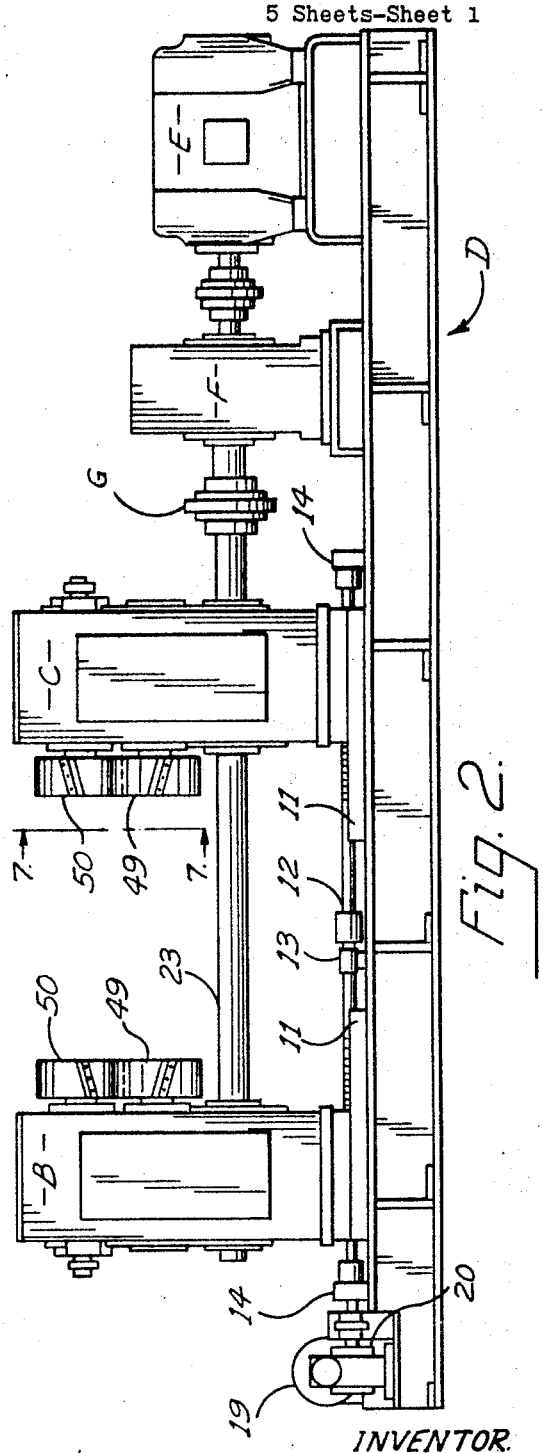
INVENTOR.
GORDON C. TURNER
BY
ATTORNEYS.

Aug. 12, 1969     G. C. TURNER     3,460,228
ROTARY SCRAP CHOPPER
Filed June 27, 1966     5 Sheets-Sheet 2
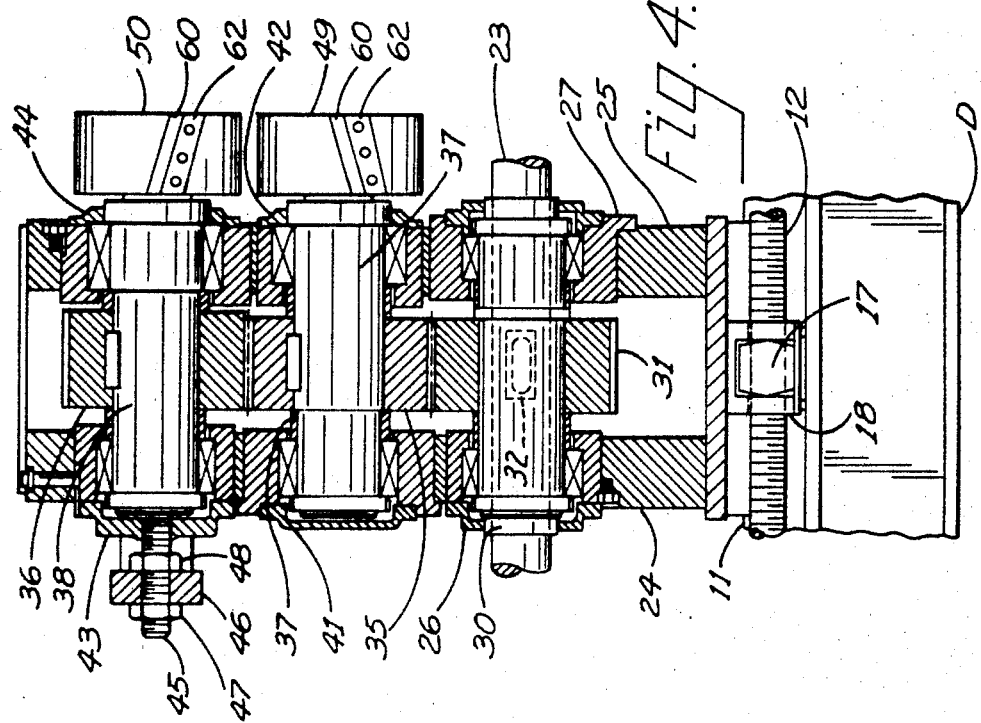
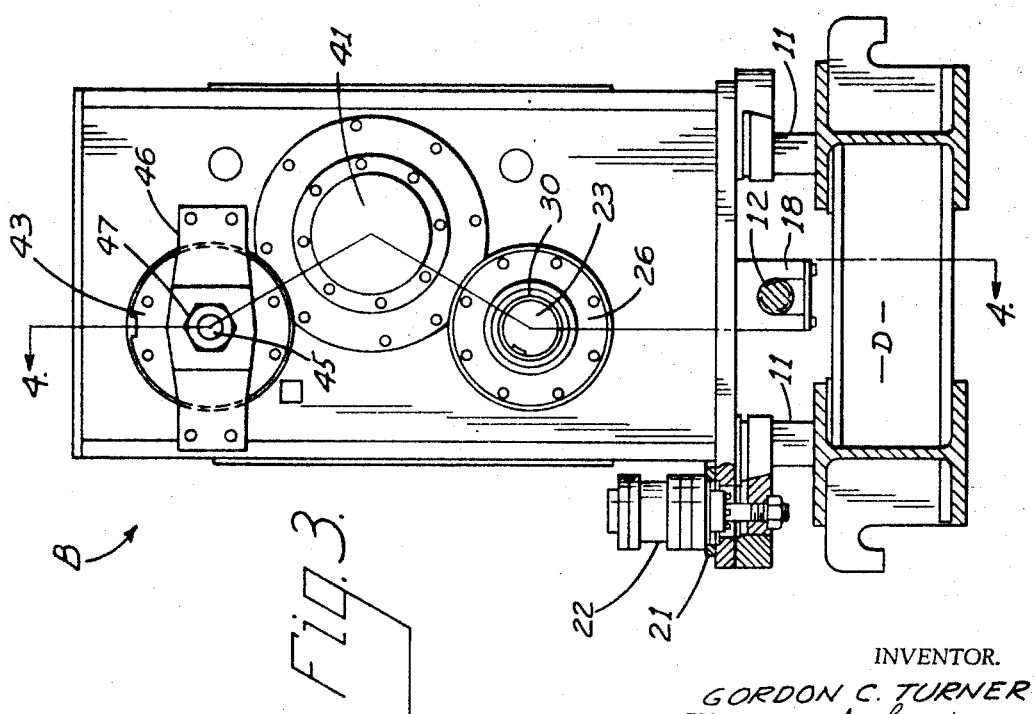
INVENTOR.
GORDON C. TURNER
BY
ATTORNEYS.

Aug. 12, 1969  G. C. TURNER  3,460,228
ROTARY SCRAP CHOPPER
Filed June 27, 1966  5 Sheets-Sheet 3
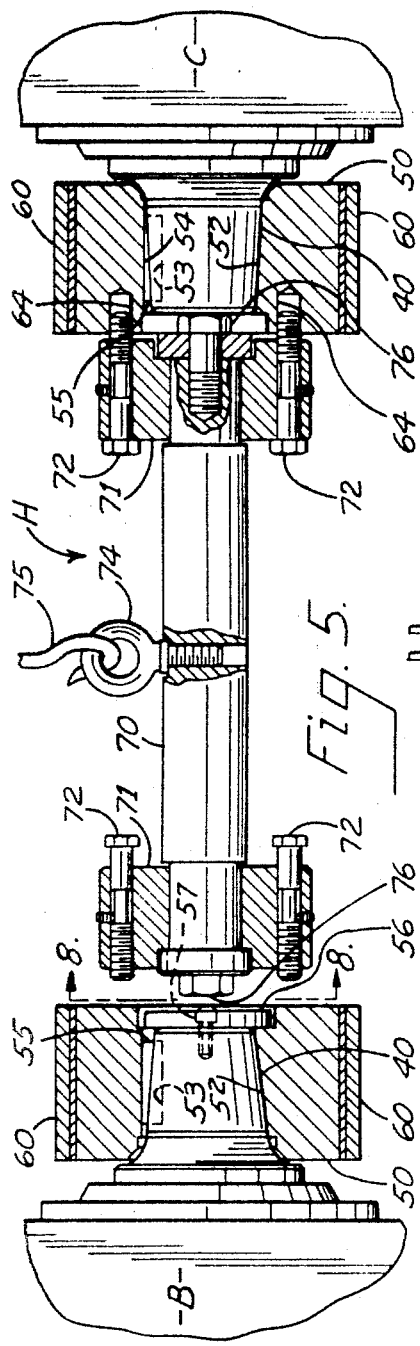
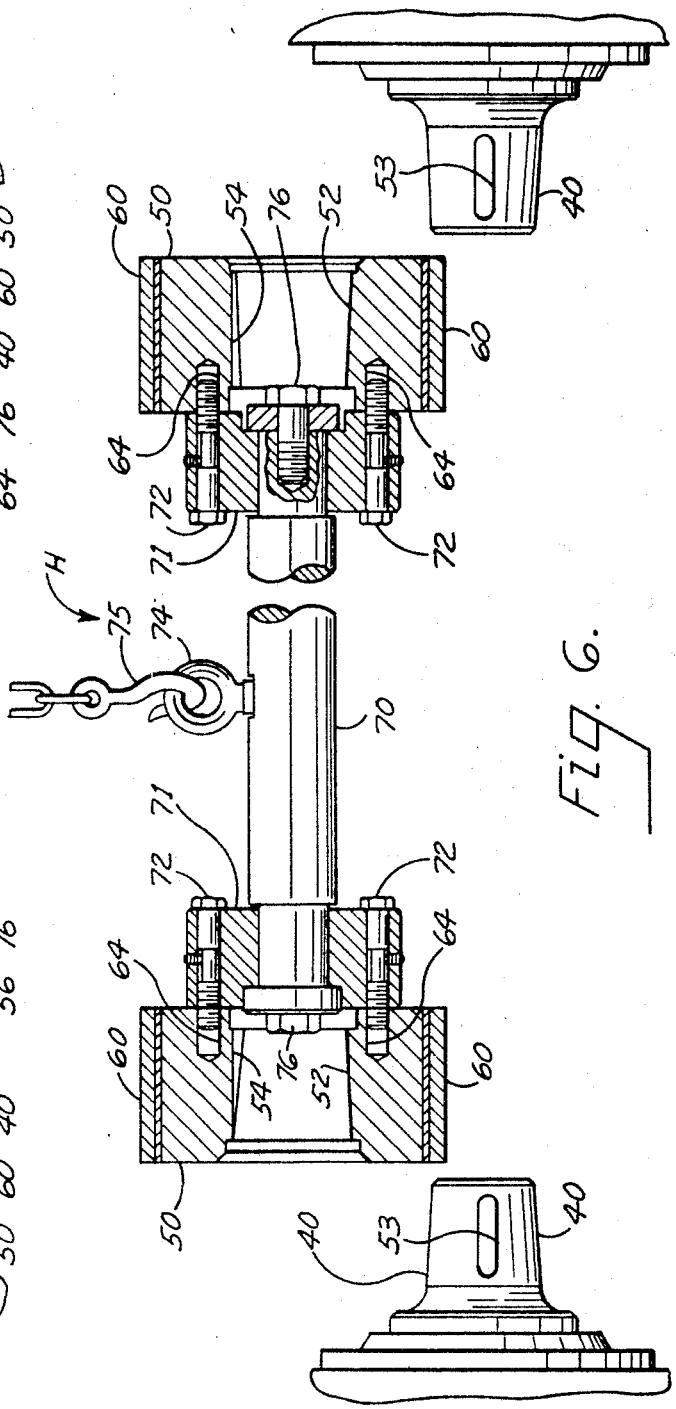
INVENTOR.
GORDON C. TURNER
BY
ATTORNEYS.

Aug. 12, 1969 G. C. TURNER 3,460,228
ROTARY SCRAP CHOPPER
Filed June 27, 1966 5 Sheets-Sheet 5

INVENTOR.
GORDON C. TURNER
BY
ATTORNEYS.

United States Patent Office 3,460,228
Patented Aug. 12, 1969

3,460,228
ROTARY SCRAP CHOPPER
Gordon C. Turner, Ellwood City, Pa., assignor to Blaw-Knox Company, Pittsburgh, Pa., a corporation of Delaware
Filed June 27, 1966, Ser. No. 560,708
Int. Cl. B23d 15/02
U.S. Cl. 29—200                                    7 Claims

ABSTRACT OF THE DISCLOSURE

Apparatus for cutting long narrow lengths of scrap, such as those that are produced in continuously trimming the edges of steel strip, into finite lengths. The construction in cooperation with a shearing head changer enables the rotary shearing heads to be rapidly removed and replaced.

---

This invention relates to scrap choppers for cutting the long narrow lengths of scrap, such as those that are produced in continuously trimming the edges of sheet material, such as steel strip, into short lengths that can be disposed of conveniently, and more particularly to a construction that enables the cutting knives of scrap choppers to be changed rapidly and to be accurately ground, sharpened and reinstalled.

Scrap choppers are used in conjunction with edge trimming lines in the manufacture of metal strip in which the strip is trimmed accurately to width by continuously trimming ribbons of scrap from both edges. These ribbons may vary from, for example, one to three inches in width, and are of the gauge of the material being rolled or produced. Since the edge trimming lines may operate at speeds of 600 feet per minute or more, it is customary to chop the ribbons of scrap coming from the edge trimmer into short lengths, say eight or nine inches, so that the scrap can be conveniently handled. This is accomplished by scrap cutters or shears on either side of the machine which engage the ribbons of scrap that are discharged from the edge trimmer. Each shear comprises a pair of rotary cutting heads, each of which contains several, for example five, knives equally spaced circumferentially and preferably disposed at a slight helix angle. The knives engage opposite sides of the ribbons of scrap that are fed between the rotary cutter heads and are driven at approximately the speed of the strip in the edge trimming line. The duty is severe and the knives are subject to considerable wear. They must be replaced or sharpened at fairly frequent intervals. Heretofore, replacement of the knives has taken about two hours and requires considerable skill in order to secure proper adjustment of the blades. Since the entire edge trimming line must be shut down while the blades of the scrap chopper are being changed, the replacement of the blades has been an expensive operation resulting in serious losses of production.

It is therefore a general object of the present invention to provide an improved scrap chopper in which the time required to remove and replace the rotating blades is greatly reduced as compared with present practice.

Another object is the provision of a scrap chopper in which accuracy of alignment of blades with respect to each other is improved as compared to present practice and in which adjustment of the blades after they have been installed in the machine is ordinarily not required.

Briefly, according to a preferred form of the invention, these advantages are obtained by providing the machine with detachable knife heads carrying the blades, these heads being mounted on arbors in the machine, and by providing changer bars on which the knife heads are mounted to remove them from or replace them in the machine. Preferably, a special arbor is also provided on which the knives are accurately ground while they are removed from the machine, this operation being carried out during the time that the machine is operating with another set of knife heads and knives in place.

In the drawings, which illustrate a preferred form of the machine:

FIGURE 1 is a plan view of a scrap chopper made according to the present invention;

FIGURE 2 is an elevation of the scrap chopper shown in FIGURE 1;

FIGURE 3 is an end view of one of the housings for supporting the cutting knives;

FIGURE 4 is a sectional view taken along the line 4—4 of FIGURE 3;

FIGURE 5 illustrates the manner in which the knife heads are removed from or replaced in the machine;

FIGURE 6 shows a subsequent step in the removal of the knife heads from the machine;

Figure 7:
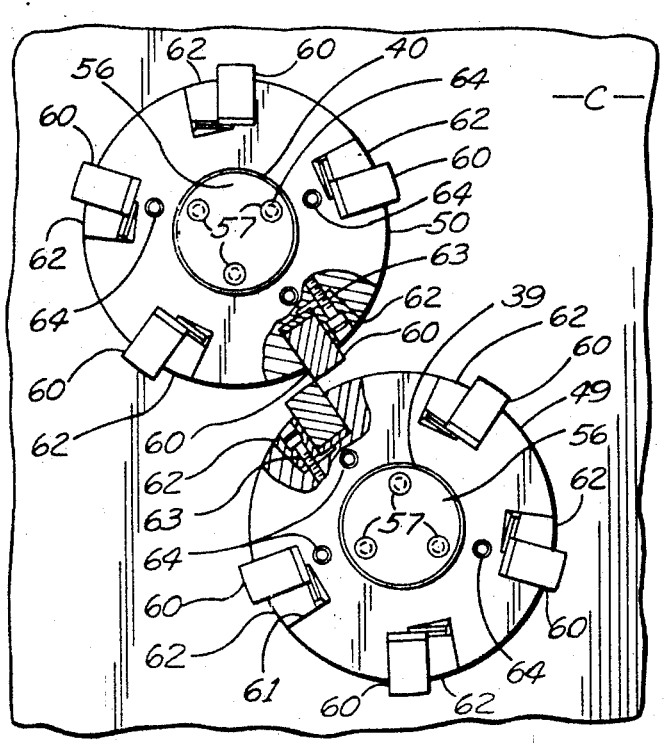
FIGURE 7 illustrates the cutting action of the knife heads, the view being taken on line 7—7 of FIGURE 1.
Figure 8:
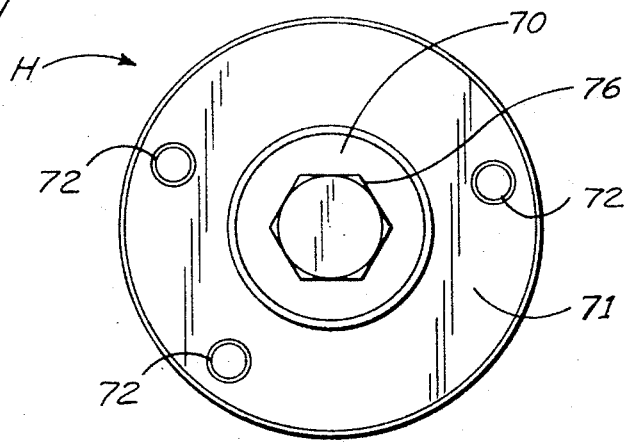
FIGURE 8 is an end view of the changer bar, the view being taken as indicated by line 8—8 of FIGURE 5.

Referring more particularly to the drawings, there is shown a rotary knife scrap cutter A embodying the invention and including a pair of spaced housings B and C mounted for lateral adjustment on a base D. Also mounted on the base D are a motor E, a gear case F and a coupling G. The housings B and C are adjustably mounted on sliding ways 11 fastened to the base D and are adjustable toward and away from one another to provide a desired spacing of the cutting knives. Adjustment is accomplished by means of a housing adjustment screw 12 which is journaled in a central bearing 13 and two end bearings 14. One-half of the screw 12 has a left-hand thread and the other a right-hand thread, each thread being received in a floating nut 17 mounted in a bracket 18 attached to the underside of each housing B and C. Accordingly, turning of the screw moves the housings B and C in opposite directions toward or away from one another.

Turning of the screw 12 is accomplished by means of a reversing motor 19 which is flexibly coupled to a gear case 20 which in turn is flexibly coupled at right angles to the adjustment screw 12.

Once the housings B and C have been adjusted to a desired spacing, they are securely fixed to the ways 11 by means of hydraulically operated clamps 21 best shown in FIGURE 3. Hydraulic cylinders 22 controlled by solenoid valves provide the necessary clamping pressure.

Extending from the coupling G and through each of the housings B and C is a drive shaft 23. With reference to FIGURES 3 and 4 which depict the housing B, it will be seen that the housing comprises two spaced plates 24 and 25 through which the drive shaft 23 extends. The shaft 23 is journaled in each of the plates 24 and 25 by means of bearing cartridges 26 and 27 of conventional construction and a hollow sleeve 30 that carries a helical-gear 31 that is keyed to the sleeve. The sleeve 30 is journaled in the bearing cartridges 26 and 27 and is concentric with and positioned around the drive shaft 23. Torque from the drive shaft 23 is transmitted to the hollow sleeve 30 by a T-head key 32 located under the gear 31 so that the gear 31 must be removed from the sleeve 30 before the key 32 can be removed from the sleeve 30 and the drive shaft 23. Key 32 engages an elongated keyway 23a in shaft 23 so that the housing B and C can be moved on the base without disturbing the driving connection between the shaft and the gear 31.

The gear 31 meshes with a second helical gear 35 which in turn meshes with a third helical gear 36, the gears 35 and 36 having identical dimensions and being keyed to arbor shafts 37 and 38, the arbor shafts 37 and 38 having outwardly extending tapered arbors 39 and 40, respectively (see FIGURE 7). The arbor shaft 37 is journaled in bearing cartridges 41 and 42 mounted in the plates 24 and 25 and the arbor shaft 38 is likewise journaled in bearing cartridges 43 and 44 as best shown in FIGURE 4. Axial adjustment of the shaft 38 is provided for by means of a screw 45 extending through the cartridge 43 from the shaft 38 and slidably received in a bore of a bracket 46, the adjustment being provided for by means of adjusting nuts 47 and 48.

Mounted on each arbor 39 and 40 are shearing heads 49 and 50 as best shown in FIGURES 5 to 8, the arbor 40 and shearing head 50 so each housing B and C being specifically depicted and being illustrative of the construction and operation of the arbor 39 and shearing head 49 as well. The arbor 40 has a tapered surface adapted to be received in a tapered bore 52 formed in the shearing head 50. The tapered surface of the arbor 40 is provided with a key slot 53 (FIGURE 6) and formed in the shearing head 50 is an axial keyway 54, the keyways 53 and 54 being adapted to receive a key 55 for positioning the shearing head 50 in proper circumferential relation on the arbor 40. As shown in the lefthand portion of FIGURE 5, the shearing head 50 is secured to the arbor 40 by means of a locking plate 56 secured to the end of the arbor by means of machine screws 57.

Referring next to FIGURE 7, the shearing heads 49 and 50 carry equally spaced shearing knives 60 mounted with a helix angle in radial slots 61 and secured therein by means of wedge blocks 62, the blocks being tightened down and securely fastened to the shearing heads 49 and 50 by means of machine screws 63.

As indicated above, the knives 60 are positioned with a slight helix angle relative to the cylindrical surface of the shearing heads 49 and 50, the knives on the head 49 being located in opposite diagonal relationship with the knives of the head 50 as best shown in FIGURE 4 so that the blades mate at their tangent points.

The knives 60 on the shearing head 49 are so positioned relative to the knives 60 on the shearing head 50 as to provide opposed shearing pairs which move through tangential circular paths of travel and come into sufficiently close proximity to one another to shear an edge strip being passed between the shearing heads into finite lengths. This relationship is best shown in FIGURE 7. It will be noted that there is no overlap between the edges of the knives since any clashing of the knives could result in serious damage to the knives and to the machine. The opposed pair of knives are positioned closely to one another when in their cutting position, however, to assure proper shearing of the material.

Conventionally, guides are provided to guide the strips to the shearing heads and to guide the sheared pieces to another conveyor. These devices are well known and are not illustrated herein.

In accordance with the invention, the shearing heads 49 and 50 may be quickly removed and replaced by a fresh set of heads without removing the knives from their slots. This may be accomplished rapidly and without difficulty by means of a special shearing head changer H as illustrated in FIGURES 5 and 6. The changer H consists of a central carrier bar 70 having swivel heads 71 mounted for free rotation at each end. The heads 71 carry draw bolts 72 adapted to be threaded into threaded bores 64 in the shearing heads 49 and 50.

When it is desired to change the shearing heads, the main drive motor E is turned off and the hydraulically operated housing clamps 21 are released. A changer H supported by means of the eye bolt 74 which is engaged by the hook 75 of a crane, for example, is then positioned between the housings B and C in substantial alignment with the axis of the upper shearing heads 50. The locking plates 56 are removed from the arbors 40 and the housings B and C are moved toward each other to place the swivel heads of the changers near the arbors. One of the swivel heads of the changers is then moved to a position adjacent either one of the upper shearing heads 50. That swivel head 71 is then rotated until its draw bolts 72 are aligned with the threaded bores 64 formed in the adjacent shearing head 50. Spacer bolts 76 secured in each end of the carrier bar 70 provide a small clearance between the swivel heads 71 and the shearing heads so that tightening of the draw bolts 72 breaks the taper lock and loosens the shearing head on the arbor. The housings are then moved toegther until the swivel head 71 on the other end of the carrier bar 70 is close enough so that the draw bolts on it can be screwed into the other head 50. The drawbolts are then tightened to break the taper lock between that arbor and the head, The housings B and C are then separated to premit the withdrawal of the assembly of shearing head changer and shearing heads from the apparatus. The keys 55 remain in the keyways 53.

After the upper shearing heads 50 have been removed, the same procedure is carried out with another shearing head changer H to remove the lower shearing heads 49.

Before the apparatus is stopped and before the shearing heads are removed, replacement knife heads 49 and 50 are mounted on two other shearing head changers H and the assemblies of changers and shearing heads disposed in a convenient location near the apparatus. As soon as the worn heads 49 have been removed, the carrier bar 70 that has the replacement shearing heads 49 in place on it is disposed between the housings in substantial alignment with the lower arbors 39. The shift 23 is rotated by hand to rotate the keys on the lower arbors into positions where they can be seen by the operator in order to facilitate the matching of the keyways in the shearing heads with the keys on the arbors. One of those shearing heads is then rotated until its keyway 54 is in substantial alignment with the key 55 carried by the arbor and the carrier is moved in an axial direction to slide this shearing head onto its adjacent arbor. After one head 49 has been positioned on its arbor in this manner, the other knife head is rotated on its swivel head 71 to align its keyway with the key 55 on the other arbor 39 and then the housings B and C are slowly moved toward each other until both shearing heads fit snugly on their tapered arbors, Next, the draw bolts 72 are withdrawn from both shearing heads and the shearing heads are each tapped with a babbitt hammer to seat the heads on the tapered arbors. The housings B and C then may be moved apart a short distance and the changer H removed, leaving the shearing heads in place. Then the keeper plates 56 are secured in position by the bolts 57.

After the lower shearing heads 49 have been installed the same procedure is employed to install the upper shearing heads 50, another carrier H having previously been prepared with replacement knife heads 50 ready for immediate installation. After the upper shearing heads 50 have been installed, the alignment of the knife edges on each pair of arbors is checked. As described below, the knives are accurately ground to size. Also, the keys 55 accurately locate the shearing heads with respect to the arbors. Therefore, only slight adjustment, if any, of the position of the shearing heads is required. This may be accomplished by axial adjustment of the top arbors by means of the adjusting nuts 47 and 48 and the screw 45 to give the desired accurate cooperation between the blades on the upper and lower shearing heads. After the required adjustment has been made, the apparatus can be put back into operation by moving the housings B and C to the correct spacing for the strip being trimmed, clamping the housings in place and starting the main drive motor.

Figure 9:
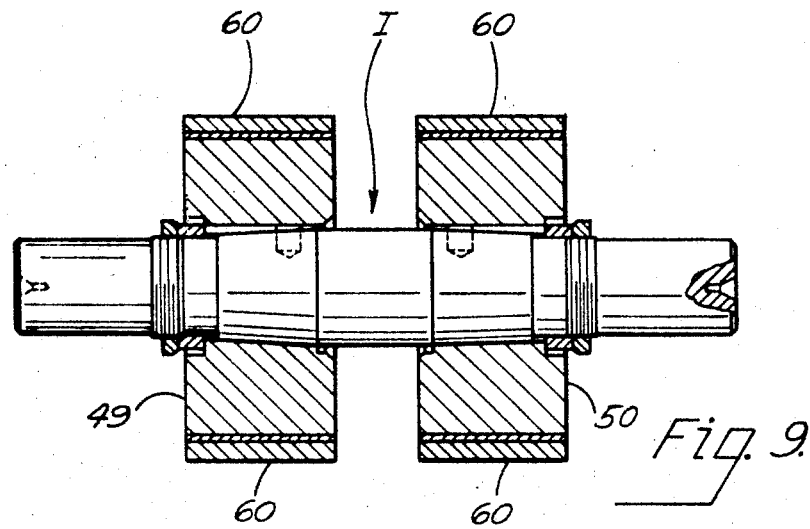
FIGURE 9 illustrates the arbor upon which the knife heads are mounted for grinding to sharpen them.

FIGURE 9 shows a grinding arbor I on which a pair of heads 49 and 50 may be mounted for grinding simultaneously while the arbor is being rotated. In this way the knives of each head may be ground precisely to the correct diameter to ensure proper matching of the knife blades. Prior to grinding, it is necessary to loosen the wedge blocks 62, shim up the knives to compensate for wear and retighten the wedge blocks.

Figure 10:
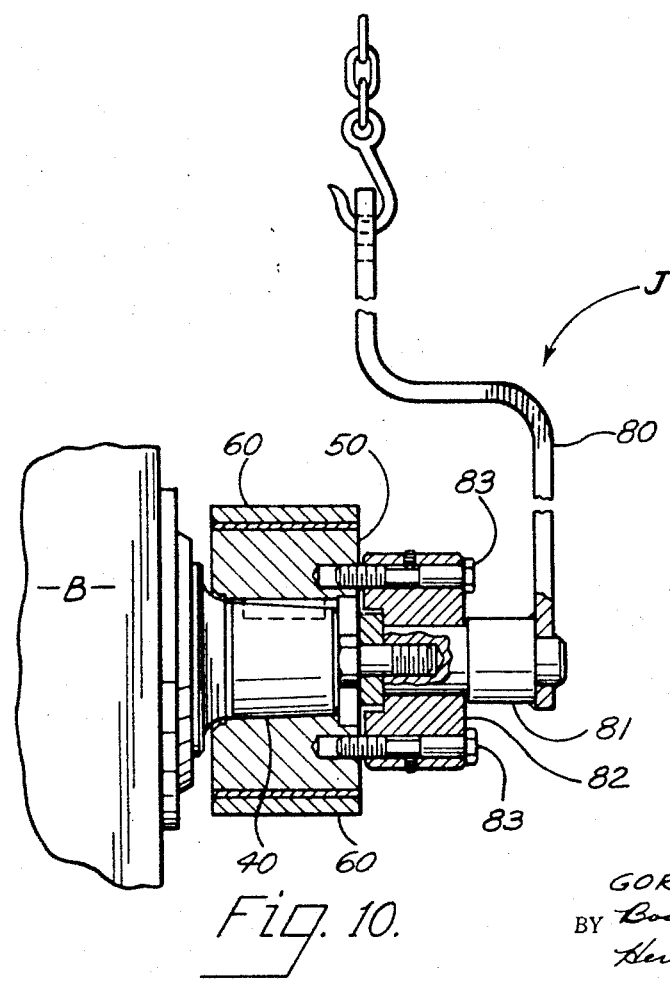
FIGURE 10 illustrates a modified form of changing device useful when it is desired to change only one knife head at a time.

FIGURE 10 illustrates another form of changer J which may be used to mount or remove the heads 49 and 50, one at a time. The changer J includes a supporting rod 80, a carrier stud 81 and a swivel head 82 carried on the stud 81 and having draw bolts 83. The operation is identical to that of the changer H shown in FIGURES 5 and 6 except that when the draw bolts 83 have been tightened to break the taper lock, the changer I can be moved axially away from the arbor 39 or 40 to remove the head 49 or 50 without moving the housings B and C.

While the invention has been described and depicted with reference to specific embodiments thereof, it will be understood that this is for the purpose of illustration rather than limitation and other variations and modifications will occur to those skilled in the art upon a reading of the specification, all within the intended spirit and scope of my invention as defined in the appended claims.

I claim:

1. In an apparatus for shearing a continuous strip into finite lengths including a rotary shearing head detachably secured to an arbor, the improvement which comprises a head changer having a member adapted to be positioned adjacent said arbor and head removal means carried by said member and attachable to said shearing head, said head removal means being operable to force said head axially outward relative to said arbor whereby said head is then supported by said member.

2. Apparatus as defined in claim 1 wherein said arbor has a conical taper toward its outer end and said shearing head has a complementary tapered conical bore.

3. Apparatus as defined in claim 1 wherein said head removal means comprises draw bolts carried by said member and adapted to fit threaded bores formed in said shearing head, whereby tightening said bolts in said threaded bores forces said shearing head axially outward relative to said arbor.

4. In an apparatus for shearing into finite lengths a continuous edge strip trimmed from a sheet metal band, said apparatus including two spaced arbors, a pair of rotary shearing heads one detachably secured to each arbor in positions spaced apart sufficiently to receive therebetween an edge strip to be sheared and means defining an axial bore extending through each of said heads, said bores being complementary to said arbors; the improvement which comprises a head changer including a member adapted to be positioned in alignment with and against one of said arbors, draw bolts carried by said member and adapted to fit threaded bores formed in said shearing heads, whereby tightening said bolts in said threaded bores forces the head axially outward relative to its arbor, said head being then supported by said member.

5. Apparatus for shearing into finite lengths, continuous edge strips trimmed from opposite sides of a metal band, comprising a frame, two spaced housings mounted in opposed relation for sliding movement on said frame, means for moving said housings toward and away from one another, four arbors including two spaced parallel arbors in each housing, each of said arbors having a conical taper toward its outer end, rotary drive means to turn the two arbors of a housing in opposite directions at speeds synchronized with one another, two pairs of rotary shearing heads, one pair mounted on the arbors of each of said housings, each of said heads having an axial bore with a conical taper complementary to said arbors, means for detachably securing said shearing heads to said arbors, head changer means attachable to opposed heads on opposite housings and operable to release said opposed heads from their arbors and to suport said opposed heads in fixed position while said housings are moved away from one another to remove said opposed heads from said arbors.

6. Apparatus as defined in claim 5 wherein said head changer means comprises a carrier bar having swivel heads mounted on each end, said bar adapted to be positioned in axial alignment with opposed arbors on opposite housings, draw bolts slidably carried by each of said swivel heads and adapted to fit threaded bores in said shearing heads, whereby when an end of said carrier bar bears against the adjacent arbor, the draw bolts of the adjacent swivel head may be tightened in said bores to move the shearing head axially outward on the arbor to break the taper lock, the head being then supported by the carrier bar.

7. Apparatus for shearing into finite lengths, continuous edge strips trimmed from opposite sides of a metal band, comprising a frame, two spaced housings mounted in opposite relation on said frame, means for moving said housings toward and away from one another, four arbors including two spaced parallel arbors in each housing, rotary drive means to turn the two arbors of a housing in opposite directions at speeds synchronized with one another, two pairs of rotary shearing heads, one pair mounted on the arbors of each of said housings, each of said heads having an axial bore complementary to said arbors, means for detachably securing said shearing heads to said arbors, head changer means attachable to opposed heads on opposite housings and operable to release said opposed heads from their arbors and to support said opposed heads in fixed position while said housings are moved away from one another to remove said opposed heads from said arbors.

References Cited

UNITED STATES PATENTS

| 1,818,626 | 8/1931 | Johnston | 29—264 X |
| 2,696,039 | 12/1954 | Baker. | |
| 2,706,502 | 4/1955 | Fink et al. | 29—264 X |
| 3,005,324 | 10/1961 | Zeller | 29—256 X |

THOMAS H. EAGER, Primary Examiner

U.S. Cl. X.R.

29—256, 264